United States Patent [19]
Zarski

[11] Patent Number: 5,823,136
[45] Date of Patent: Oct. 20, 1998

[54] CARRIABLE PET FEEDING SERVICE

[76] Inventor: John A. Zarski, 11456 Meadowbrook, Warren, Mich. 48093

[21] Appl. No.: 631,913

[22] Filed: Apr. 15, 1996

[51] Int. Cl.⁶ .............................. A01K 5/01; A01K 7/00
[52] U.S. Cl. ..................... 119/61; 119/51.5; 220/23.83
[58] Field of Search ............................. 119/515, 61, 792; 224/148.4, 679, 682; 206/223, 229, 541, 543, 544, 547, 581; 220/4.22, 4.24, 23.83, 23.86; 190/102, 110, 111

[56] References Cited

U.S. PATENT DOCUMENTS

| | | | |
|---|---|---|---|
| D. 217,360 | 4/1970 | Robert | D30/131 |
| D. 336,555 | 6/1993 | Goetz | D30/131 |
| 1,194,466 | 8/1916 | Berg | 206/544 |
| 1,849,565 | 3/1932 | Brady | 190/110 |
| 2,499,254 | 2/1950 | Parker | 206/544 |
| 2,555,396 | 6/1951 | Cosner | 119/61 |
| 2,799,427 | 7/1957 | Shekter | 220/23.83 |
| 2,813,509 | 11/1957 | Bruno | 119/61 |
| 3,225,983 | 12/1965 | Majka | 224/679 X |
| 3,730,141 | 5/1973 | Manning et al. | 119/51.5 |
| 4,192,256 | 3/1980 | Clugston | 119/51.5 |
| 4,532,891 | 8/1985 | Jones | 119/61 |
| 4,569,082 | 2/1986 | Ainsworth et al. | 206/581 X |
| 4,651,679 | 3/1987 | Fassauer | 119/51.5 |
| 4,699,089 | 10/1987 | Teschke | 119/51.5 |
| 4,716,855 | 1/1988 | Andersson et al. | 119/61 |
| 4,890,741 | 1/1990 | Edelstein | 220/23.83 X |
| 4,919,295 | 4/1990 | Hitzler | 220/23.83 |
| 5,000,123 | 3/1991 | Morse et al. | 119/61 |
| 5,031,575 | 7/1991 | Phillips | 119/61 |
| 5,297,504 | 3/1994 | Carrico | 119/61 |
| 5,316,159 | 5/1994 | Douglas et al. | 220/23.83 X |
| 5,318,084 | 6/1994 | Jackson | 224/682 X |
| 5,445,110 | 8/1995 | Birnie | 119/61 |
| 5,458,087 | 10/1995 | Prior et al. | 119/61 X |
| 5,615,765 | 4/1997 | Roericht | 220/4.22 X |

OTHER PUBLICATIONS

Aladdin's (™) King Size Lunch Kit Product of Aladdin Ind, Inc, Nashville, TN 37210. Date not Known; Similar Type Products are More Than 1yr–Before Apr. 12, 1996.

*Primary Examiner*—Robert P. Swiatek
*Assistant Examiner*—Elizabeth Shaw
*Attorney, Agent, or Firm*—Peter D. Keefe

[57] ABSTRACT

A carriable pet food and water service which provides sealed containers for food and water, integral dishes and easy carrying during a walk with the pet. The carriable pet feeding service includes a hinged casing which opens into two half-sections. Each half-section is provided with an interior receptacle. Removably received in each receptacle is a reciprocably shaped container, one respectively for holding pourable dry or semi-dry food and the other respectively for holding water. At least one carrying strap is connected with the exterior surface of the casing so that the pet owner can easily carry the casing and its interiorly disposed food and water containers when the casing is closed. It is further preferred that the strap be serviceable as a leash, and still further preferred to include a second strap for carrying of the casing when the other strap is being used as a leash.

7 Claims, 1 Drawing Sheet

CARRIABLE PET FEEDING SERVICE

BACKGROUND OF THE INVENTION

1. Field of the invention

The present invention is related to feeding services for pets, such as dogs and cats. More particularly, the present invention is a carriable pet service having receptacles for storage of water and food, as well as built-in provision for water and food dishes.

2. Description of the Prior Art

Pets require food and water just the same as people do, and pet owners are very responsive to their pets needs in this regard. While it is a simple and routine matter to provide water and food for a pet when at home using tap water, a feed bag or food cans, and water and food dishes, servicing the nourishment needs of a pet are far from routine when traveling.

On trips in a car, a pet needs periodic access to fresh water and periodic feeding. Problematically, the pet owner is confronted not only with including water and food, but also dishes for feeding of the pet. Any of these can become separated from the others, and at feeding time the pet owner may spend much time finding the feeding components and setting them up for use by the pet. But, even on long walks with a pet, the owner may wish to carry along some sustenance and water for the pet, who is just as much entitled to refreshments along the way as the owner is. Conventional dishes are of little practical use in this environment.

Thus, what would be most beneficial is a carriable service for feeding pets.

Pet feeding services intended for use on the floor of the home are known, but are not suitable for portable use in a car, and could not be used while walking a pet. Certain portable pet feeders have been proposed in the prior art. U.S. Pat. No. 4,651,679 discloses a water and pelletized food pet feeding service having externalized trays. While this feeder is apparently useful and functional for its intended purpose, its structural configuration precludes its suitability for being carried during a walk with a pet. U.S. Pat. No. 4,192,256 discloses a water container having an integral water tray and a food receiving cavity formed in a sidewall. While water to the tray is automatically replenished as the pet drinks, water management by the owner is somewhat encumbered by this feature and there is no provision for food storage. Finally, U.S. Pat. No. 3,730,141 discloses a double tray feeder having respective water and food receptacles. While water and feed may replenshably enter into their respective trays, there is no provision for sealed water and food containers and the structural configuration of this pet feeder precludes its being carried during a walk. Another factor to consider is that pet feeding services having reservoirs which replenish food are subject to contamination, and it would therefore be desirable to have sealing closure of the food and water containers.

Accordingly, what is needed is a carriable pet food and water service which provides sealed containers for food and water, integral dishes and easy carrying during a walk with the pet.

SUMMARY OF THE INVENTION

The present invention is a carriable pet food and water service which provides sealed containers for food and water, integral dishes and easy carrying during a walk with the pet.

The carriable pet feeding service according to the present invention includes a hinged casing which opens into two half-sections. Each half-section is provided with an interior receptacle. Removably received in each receptacle is a reciprocably shaped container, one respectively for holding pourable dry or semi-dry food and the other respectively for holding water. At least one carrying strap is connected with the exterior surface of the casing so that the pet owner can easily carry the casing and its interiorly disposed food and water containers when the casing is closed. It is further preferred that the strap be serviceable as a leash, and still further preferred to include a second strap for carrying of the casing when the other strap is being used as a leash.

In operation, a pet lover fills the food container with pourable food and fills the water container with water. In this regard, the containers have threaded caps which provide selective resealing of the containers. The pet lover then places a container into each of the receptacles, respectively. The pet lover thereupon closes the casing by pivoting the half-sections mutually together via the hinge until clasped closed. Now the pet lover carries the casing by either grasping a strap or slinging it over the shoulder. The casing is then either carried if a walk is to ensue, or placed into a vehicle if a motor trip is planned. When it comes time to feed the pet, the pet lover opens the casing by pivoting apart the half-sections, removes the containers from the receptacles, then unscrews each of the caps and pours food and water into respective receptacles, wherein the receptacles now serve as feeding dishes. Whatever food and water was not dispensed remains resealed in its respective container for future feeding of the pet.

Accordingly, it is an object of the present invention to provide a portable pet feeding service which can be carried by the pet owner.

It is another object of the present invention to provide a carriable pet feeding service which has integral dishes and resealable containers for each of water and food.

It is a further object of the present invention to provide a carriable pet feeding service which has integral dishes and resealable containers for each of water and food, wherein a container is receivable into each of the receptacles when the pet feeding service is not in use feeding the pet.

It is another object of the present invention to provide a carriable pet feeding service which includes at least one carrying strap, wherein the carrying strap is also functionable as a leash for the pet.

These, and additional objects, advantages, features and benefits of the present invention will become apparent from the following specification.

BRIEF DESCRIPTION OF THE DRAWINGS

FIG. 1 is a perspective view of the carriable pet feeding service according to the present invention, wherein the casing thereof is shown in its open state and the containers thereof are shown containing respectively food and water.

FIG. 2 is a partly sectional end view along line 2—2 in FIG. 1, wherein water is shown being dispensed into one receptacle and food is shown in phantom being dispensed into the other receptacle.

FIG. 3 is a perspective view of a container of the carriable pet feeding service according to the present invention, shown containing pourable food.

FIG. 4 is a perspective view of the carriable pet feeding service according to the present invention, wherein the casing is shown in its closed state.

FIG. 5 is a partly sectional end view along line 5—5, wherein the containers are shown respectively containing food and water.

DETAILED DESCRIPTION OF THE PREFERRED EMBODIMENT

Figures 1, 2, 3, 4, 5:
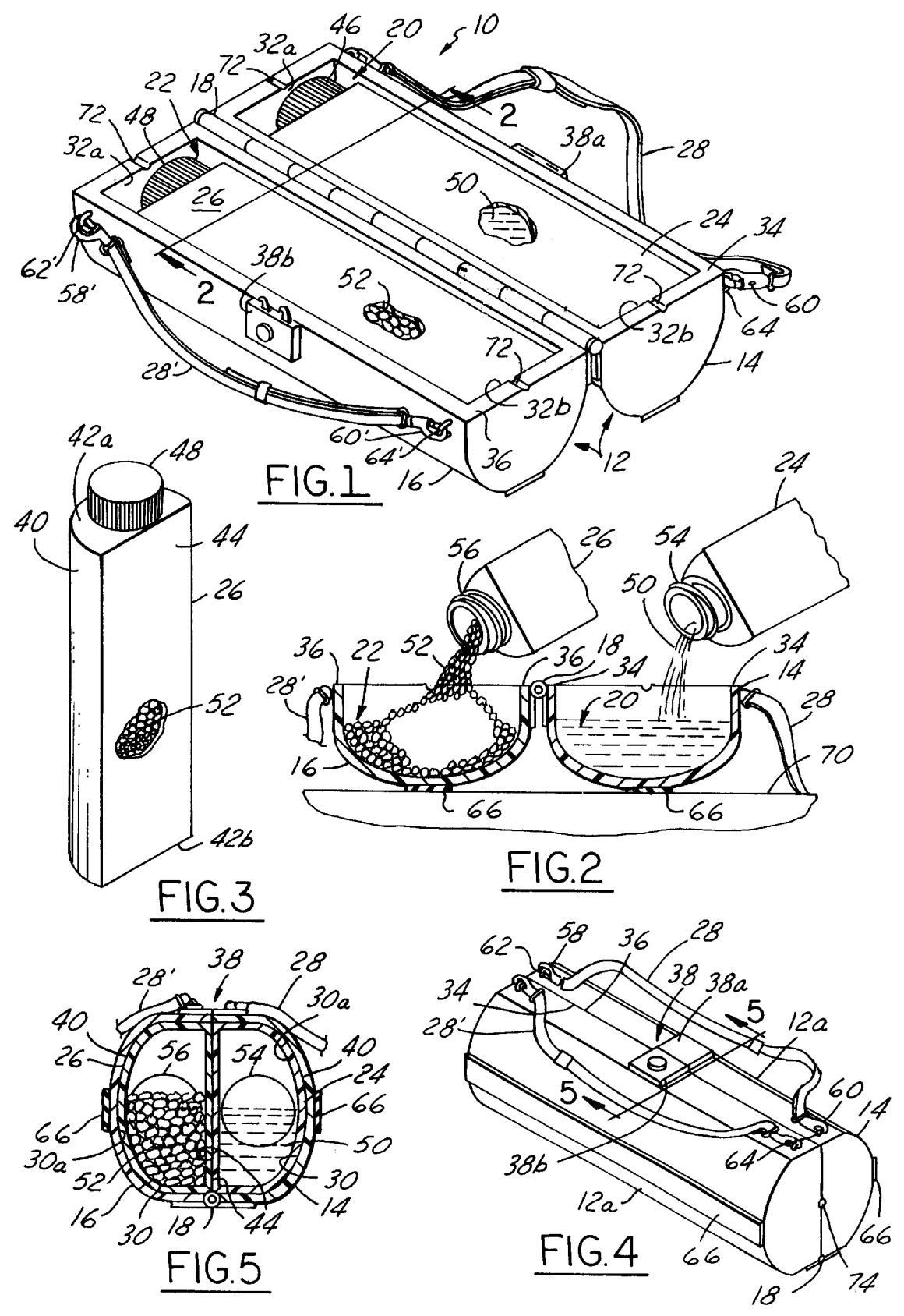

Referring now to the Drawing, FIG. 1 depicts the carriable pet feeding service 10 according to the present invention in its open state. The carriable pet feeding service 10 generally includes a casing 12 composed of first and second half-sections 14, 16 which are mutually interconnected by a hinge 18, a first receptacle 20 formed interiorly with respect to the first half-section and a second receptacle 22 formed interiorly with respect to the second half-section, a first selectively resealable container 24 shaped reciprocably with respect to the first receptacle so as to be seatable therewithin and a second selectively resealable container 26 shaped reciprocably with respect to the second receptacle so as to be seatable therewithin, and a first carrying strap 28 connected to the exterior surface 12a of the casing wherein the first strap is selectively serviceable as a pet leash. The first and second containers 24, 26 are filled, respectively, with water and pourable food.

In operation as generally shown by FIGS. 1, 2 and 4, the casing 12 is carried in its closed state as shown in FIG. 4. When pet feeding time comes, the first and second half-sections 14, 16 are pivoted on the hinge 18 to the open state of the casing shown by FIG. 1. The first and second containers 24, 26 are removed from their respective receptacles 20, 22 and the contents thereof poured respectively into the first and second receptacles, which now serve as feeding dishes. The pet then feeds. When the pet is finished feeding, the first and second containers are replaced into their respective first and second receptacles, the casing returned to its closed state, and the casing carried by the pet lover.

Referring additionally now to the remaining Figures, the structure and function of the preferred embodiment will be detailed with greater specificity.

The casing 12 is constructed of a durable and rigid material, preferably a plastic, but other suitable materials could be used such as aluminum. The first and second half-sections 14, 16 of the casing 12 are provided with, respectively, the first and second receptacles 20, 22, wherein a semi-cylindrical shape thereof is preferred (a "semi-cylindrical" shape being cross-sectionally depicted in FIG. 5, wherein the first and second receptacles have a contoured receptacle wall 30 which includes an axially oriented concave shaped portion 30a, and further have mutually parallel first and second receptacle end walls 32a, 32b, shown in FIG. 1). While not required, a semi-cylindrical shape is preferred since feed particles and water will tend to collect by action of gravity toward the apex of the concave shaped portion 30a, thereby making feeding easier for the pet. Since the first and second receptacles serve as feeding dishes, the first and second half-sections are structurally nonporous so that the first and second receptacles will hold liquid therein without leaking.

The exterior surface 12a of the casing 12 is preferred to have a generally cylindrical shape, as shown by FIG. 4. In this regard, the exterior surface 12a generally follows the shape of the interior hollow space of the casing 12 defined collectively by the first and second receptacles 20, 22. The first and second half-sections 14, 16 are symmetrical with respect to each other, wherein the casing 12 is bisectedly divided among the first and second half-sections. Thus, the first and second half-sections respectively have a bisectional terminous 34, 36 formed at the bisection of the casing 12, which mutually adjoin when the casing is in its closed state, and which mutually are in a common plane (which is desirably horizontal) when the casing is in its open state.

The hinge 18 pivotally conjoins the first and second half-sections 24, 26 at the bisectional terminous 34, 36 thereof. The hinge 18 is preferred to be of strong construction so that it is very resistant to mechanical failure. Accordingly, while the hinge 18 may be constructed of plastic, it is preferred for the hinge to be constructed of a weather resistant metal. The hinge 18 is connected to the exterior surface 12a of the casing 12 by any suitable known connection mechanism, such as an adhesive or fasteners (and, in the event the casing and the hinge are manufactured of plastic, the hinge may be integral with the first and second half-sections).

In order that the first and second half-sections 14, 16 be kept together when the casing 12 is in its closed state, a clasp 38 is provided on the casing 12 opposite with respect to the hinge 18. The clasp 38 has a first clasp component 38a connected with the first half-section 14 and a second clasp component 38b connected with the second half-section 16, wherein the first and second clasp components interconnect fastenably when the casing 12 is in its closed state. The clasp 38 may be of any suitable type known in the art. The preferred clasp 38 has a spring loaded release which allows the user to selectively release the clasp interconnection to thereby allow for the first and second half sections 14, 16 to be pivoted to thereby place the casing 12 in its open state.

The first and second containers 24, 26, are constructed of a durable material, such as plastic, most preferably a clear or translucent plastic. As best indicated by FIG. 5, the first and second containers 24, 26 are shaped reciprocably with respect to the first and second receptacles 20, 22 for being seatably received therein in a selectively removable manner. Accordingly, each of the first and second containers 24, 26 has a contoured sidewall 40 which follows the contoured receptacle walls 30 and has top and bottom end walls 42a, 42b which reciprocably follow the first and second receptacle end walls 32a, 32b of the first and second receptacles 20, 22. Further, the first and second containers 24, 26 have a bisectional sidewall 44 whereby when the first and second containers are respectively seated in their respective first and second receptacle 20, 22, the bisectional sidewall is at, or slightly recessed from, the respective bisectional terminous 34, 36.

Each of the first and second containers 24, 26 include a selectively removable cap 46, 48 which allows for sealing closed the container for keeping therein the contents thereof and for the opening of the container for adding or removing contents therefrom. In this regard, the contents are preferred to be pelletized (ie., pourable) pet food 52 in one of the first and second containers, and water 50 in the other of the first and second containers. Of course, other kinds of contents can be placed into the first and second containers, such as milk for a cat. The preferred cap 46, 48 is provided with threads which threadably engage a threaded throat 54, 56 of the first and second containers 24, 26 (see FIG. 2). While it is preferred for the first and second containers 24, 26 to be identical, it may be desirable for one of the first and second containers to have a differently sized throat to accommodate the pourability of its intended class of contents.

As indicated by FIGS. 1 and 5, when the first and second receptacles 24, 26 are seated in the first and second receptacles 20, 22, the contoured sidewall 40 is closely adjacent the contoured receptacle wall 30, the bottom end 42b is closely adjacent the second receptacle end wall 32b, and the top of the caps 46, 48 is closely adjacent the first receptacle end wall 32a. As can be best understood from FIG. 5, the bisectional sidewalls 44 of the first and second containers 24, 26 are mutually closely adjacent when the casing 12 is in its closed state. Finally, as best understood from FIG. 1, the user (ie. the pet lover) is easily able to remove the first and second containers 24, 26 from the first and second receptacles 20, 22 by using his or her fingers to grasp the cap 46, 48, since there is ample finger and thumb entry space with respect to the contoured sidewall 40 at the caps (alternatively, the user could tip the casing and allow gravity to unseat the first and second containers).

The preferred structure for carrying the casing 12 is an adjustable length first strap 28. The adjustability of the length of the first strap 28 is conventional, such as by a friction buckle, and allows for two modes of carrying of the casing 12: its being hand held or its being strung over the shoulder. The preferred first strap 28 includes spring biased clips 58, 60, one each of which being located at each end thereof. The clips 58, 60 are respectively connected with a ring 62, 64 connected with the external surface of the casing 12. Accordingly, the user may disconnect the clips 58, 60 from their respective rings 62, 64 and thereupon use the first strap 28 as a leash with respect to his or her pet's collar. In this regard the first strap 28 is structurally flexible, strong and adjustably long enough to serve as a pet leash in a generally conventional manner of pet leashes.

A second strap 28' is preferred to be included so that when the first strap 28 is being used as a leash, the user may still carry the casing with ease. The second strap 28' is structured to provide adjustability of its length, thereby allowing it to be hand held or strung over the user's shoulder. The ends of the second strap 28' are connected with the external surface 12a of the casing 12 in a manner that may or may not be as described with respect to the first strap 28, ie. via rings 62', 64' and clips 58', 60'. Both the first and second straps are preferably connected with the casing at locations opposite the hinge 18, as depicted by FIG. 4.

Since the casing 12 serves as dual feed dishes, ie., each of the first and second receptacles 20, 22 are used as a feed dish, the pet may tend to cause the casing to wander on the ground as the pet uses its mouth to eat and drink. To minimize this affect, it is preferred to include high friction strips 66 along the exterior surface 12a of the casing 12 at the apex 68 of each of the first and second half-sections 14, 16 where contact with a resting surface 70 occurs (see FIG. 2). An example of a high friction material is an elastomer material having a contact adhesive on one side for providing its attachment to the exterior surface 12a.

It is preferred for the first and second receptacles 20, 22 to have ventilation when the casing 12 is in its closed state to ensure they remain dry. Accordingly, it is preferred for a groove 72 to be provided in the bisectional terminous 34, 36 at each of the first and second receptacle end walls 32a, 32b. The grooves 72 align at each of the first and second receptacle end walls to form air vent ports 74 (see FIG. 4).

In operation, a pet lover fills one of the first and second containers with pourable food and fills the other with water. The caps are then screwed onto the threaded throats of the first and second containers. The pet lover then places the first and second containers into the first and second receptacles, respectively (where the containers are identically sized and shaped, which receptacle receives which container is moot). The pet lover thereupon pivots the first and second half-sections via the hinge until the casing is clasped closed (whereupon the casing is in its closed state). Now the pet lover carries the casing by either grasping the first or second strap or slinging it over the shoulder. The casing is then either carried if a walk is to ensue, or placed into a vehicle if a motor trip is planned.

When it comes time to feed the pet, the pet lover releases the clasp and then pivots the first and second half-sections to thereby open the casing (whereupon the casing is in its open state). The pet lover then removes the first and second containers from the first and second receptacles, unscrews each of the caps and pours food and water, respectively, into the first and second receptacles. The first and second receptacles now serve as feeding dishes. Whatever food and water that was not dispensed from the first and second containers is kept by resealing via the caps for future feeding of the pet.

It should be noted that the first and/or second container may or may not be form fitted to the shape of the first and second receptacles, however, they must fit therewithin so that the casing can be placed into its closed state. Further, the first and/or second container may have a rigid or semi-rigid sidewall or may have a flexible sidewall. Also, the mechanism for selectively keeping the casing in the closed state, while preferably a clasp, may be otherwise, such as magnets.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A carriable pet feeding service, comprising:

a casing having a rigid first half-section, a rigid second half-section, and a hinge pivotally conjoining said first half-section to said second half-section, wherein said first and second half-sections are pivotable between an open state of said casing and a closed state of said casing, said first half-section having a rigid first receptacle formed therein, said second half-section having a second receptacle formed therein, wherein said first and rigid second receptacles collectively form an interior space of said casing when said casing is in said closed state;

means for selectively retaining said casing in said closed state;

a first container receivable with respect to said first receptacle; and a second container receivable with respect to said second receptacle;

wherein said closed and open states of said casing are effectable with said first and second containers seated in said first and second receptacles;

wherein said first and second half-sections are structurally nonporous so that first and second receptacles are functionable as feeding dishes;

wherein said first container is selectively resealable and reciprocably shaped with respect to said first receptacle to be seatably receivable therein; and said second container is selectively resealable and reciprocably shaped with respect to said second receptacle to be seatably receivable therein;

wherein said first and second receptacles each have a contoured receptacle wall which includes a concave shaped portion;

wherein a bisection of said casing defines a bisectional terminous of each of said first and second half-sections, said bisectional terminous of each of said first and second half-sections mutually adjoining when said casing is in said closed state, said bisectional terminous of each of said first and second half-sections being in substantially a common plane when said casing is in said open state; and wherein said first container has a first contoured wall reciprocably shaped with respect to said contoured receptacle wall of said first receptacle so that said first container is seatably receivable with respect to said first receptacle; and said second container has a contoured wall reciprocably shaped with respect to said contoured receptacle wall of said second receptacle so that said second container is seatably receivable with respect to said second receptacle.

2. The carriable pet feeding service of claim 1, wherein:

said first container has a bisectional sidewall opposite said contoured wall thereof, said bisectional sidewall of said first container being substantially recessed with respect to said bisectional terminous of said first half-section when said first container is seated in said first receptacle; and said second container has a bisectional sidewall opposite said contoured wall thereof, said bisectional sidewall of said second container being substantially recessed with respect to said bisectional terminous of said second half-section when said second container is seated in said second receptacle.

3. The carriable pet feeding service of claim 2, wherein said casing has ventilation means for providing air drying of said first and second receptacles when said casing is in said closed state.

4. The carriable pet feeding service of claim 3, further comprising first strap means for enabling a user to carry said casing while walking.

5. The carriable pet feeding service of claim 4, wherein said first strap means comprises:

a length adjustable strap having a first end and a second end;

a first clip connected to said first end;

a second clip connected to said second end;

first connection means for releasably connecting said first clip to said casing; and second connection means for releasably connecting said second clip to said casing.

6. The carriable pet feeding service of claim 5, wherein said strap is structured to serve as a pet leash when said strap is detached from said casing, wherein one of said first and second clips is clipably engageable with a collar of a pet.

7. The carriable pet feeding service of claim 6, further comprising second strap means for enabling a user to carry said casing while walking.

\* \* \* \* \*